US012561444B1

(12) United States Patent
Kosgi et al.

(10) Patent No.: US 12,561,444 B1
(45) Date of Patent: Feb. 24, 2026

(54) SOFTWARE ACCREDITATION AND ACCREDITATION WORKLOAD MANAGEMENT USING METAMODELS AND PORTFOLIO VIEW

(71) Applicant: Netimpact Strategies, Inc., Falls Church, VA (US)

(72) Inventors: Praveen Chandra Kosgi, Aldie, VA (US); Charles Wilson, Upper Marboro, MD (US)

(73) Assignee: NetImpact Strategies, Inc., Falls Church, VA (US)

( * ) Notice: Subject to any disclaimer, the term of this patent is extended or adjusted under 35 U.S.C. 154(b) by 168 days.

(21) Appl. No.: 18/138,373

(22) Filed: Apr. 24, 2023

Related U.S. Application Data

(60) Provisional application No. 63/363,595, filed on Apr. 26, 2022, provisional application No. 63/363,607, filed on Apr. 26, 2022.

(51) Int. Cl.
G06F 21/57 (2013.01)

(52) U.S. Cl.
CPC ...... G06F 21/577 (2013.01); *G06F 2221/033* (2013.01)

(58) Field of Classification Search
CPC ........................ G06F 21/577; G06F 2221/033
See application file for complete search history.

(56) References Cited

U.S. PATENT DOCUMENTS

| | | | |
|---|---|---|---|
| 10,536,352 B1 * | 1/2020 | Brisebois | G06F 16/90335 |
| 2002/0042687 A1 * | 4/2002 | Tracy | G06F 21/577 |
| | | | 702/123 |

(Continued)

OTHER PUBLICATIONS

Sachin Untawale • Sophia Ansari; Integrating Artificial Intelligence in Human Resource Management with reference to Autonomous Engineering Institutions: A Review; 2025 12th International Conference on Emerging Trends in Engineering & Technology; (Year: 2025).*

(Continued)

*Primary Examiner* — Jahangir Kabir
*Assistant Examiner* — Chao Wang
(74) *Attorney, Agent, or Firm* — FisherBroyles, LLP; James J. Pohl

(57) ABSTRACT

A system and method for accreditation of software and accreditation workload management using meta models and portfolio view is disclosed. An embodiment comprises extracting raw data from a corpus of documents, published by a regulatory organization to define standards. Further, an embodiment processes the raw data to generate meta models based on information type mapping, control mapping, and assessment procedures mapping. The meta models may comprise a set of information type, a set of security controls, a set of assessment procedures, and a set of model activities. Embodiments provide an ability to manage accreditation workload with compliance process frameworks activities. An embodiment may extract and schedule model activities associated with controls of an application. Further an embodiment may maintain a data-maps database and generate and display a portfolio view to assist a developer to manage the accreditation workload.

20 Claims, 7 Drawing Sheets

(56)        References Cited

U.S. PATENT DOCUMENTS

| 2011/0035244 | A1* | 2/2011 | Leary | ............... | G06Q 10/06314 |
| | | | | | 703/6 |
| 2019/0215381 | A1* | 7/2019 | Mukund | ................. | H04L 67/52 |
| 2020/0185072 | A1* | 6/2020 | Suarez Saiz | ........... | G16H 50/70 |

OTHER PUBLICATIONS

Stephen W. Turner • Tyler Judd • Suleyman Uludag; Experience Implementing an Automated Assessment System for Accreditation; 2024 IEEE Frontiers in Education Conference (FIE) (2024, pp. 1-9); (Year: 2024).*

Eugene Essa • Dittrich • Sergiu Dascalu; ACAT: A Web-Based Software Tool to Facilitate Course Assessment for ABET Accreditation; 2010 Seventh International Conference on Information Technology: New Generations (2010, pp. 88-93); (Year: 2010).*

\* cited by examiner

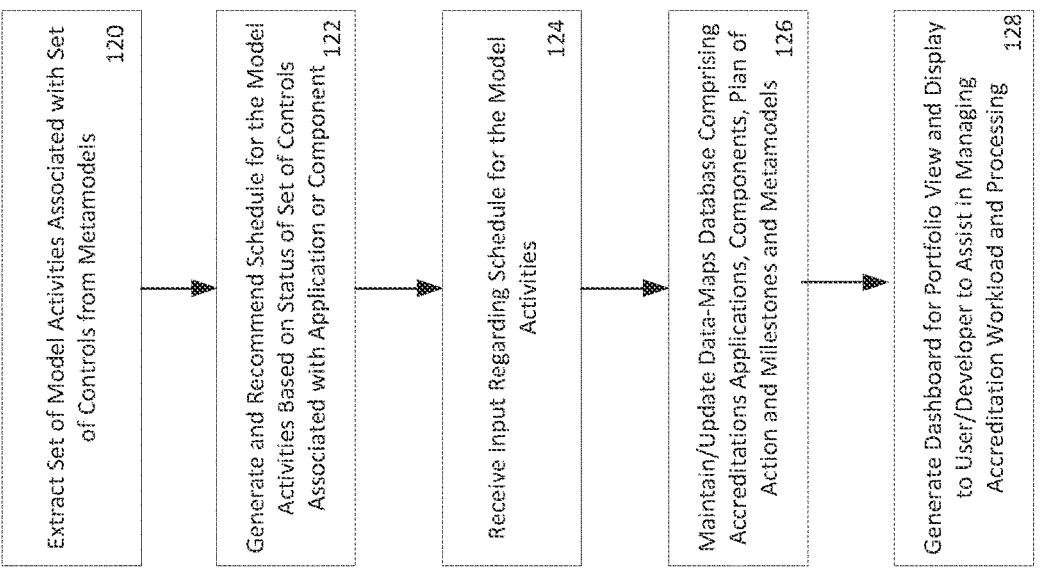

Extract Set of Model Activities Associated with Set of Controls from Metamodels     120

Generate and Recommend Schedule for the Model Activities Based on Status of Set of Controls Associated with Application or Component     122

Receive Input Regarding Schedule for the Model Activities     124

Maintain/Update Data-Maps Database Comprising Accreditations Applications, Components, Plan of Action and Milestones and Metamodels     126

Generate Dashboard for Portfolio View and Display to User/Developer to Assist in Managing Accreditation Workload and Processing     128

Figure 1(b)

SOFTWARE ACCREDITATION AND ACCREDITATION WORKLOAD MANAGEMENT USING METAMODELS AND PORTFOLIO VIEW

CROSS REFERENCE TO RELATED APPLICATIONS

This application claims the benefit of U.S. Provisional Application No. 63/363,595, filed Apr. 26, 2022, entitled "Accreditation Workload Management Using Metamodels and Portfolio View", the disclosure of which is incorporated in its entirety by this reference. This application also claims the benefit of U.S. Provisional Application No. 63/363,607, filed Apr. 26, 2022, entitled "Managing Accreditation of Software", the disclosure of which is incorporated in its entirety by this reference.

BACKGROUND

The National Institute of Standards and Technology (NIST) is responsible for defining the security and privacy policies (sometimes expressed using the term "controls") for information systems developed for the US government. These policies are intended to protect such systems from a diverse set of threats and risks, including hostile attacks, human errors, natural disasters, structural failures, foreign intelligence entities, and privacy risks. Typically, the controls are flexible and customizable, and are implemented as part of an organization-wide process to manage risk.

The controls address diverse requirements derived from one or more of mission and business needs, laws, executive orders, directives, regulations, policies, standards, and guidelines. The consolidated set of controls (referred to as the control catalog) addresses security and privacy concerns from a functional perspective (e.g., the strength of functions and mechanisms provided by the controls) and from an assurance perspective (e.g., the measure of confidence in the security or privacy capability provided by the controls).

Typically, the controls in the control catalog are selected based on the context of a software accreditation task and a definition of control applicability set by an organization (such as the NIST). As an example, the AC-1-XX Controls represent Access Controls; there are over 900 of these that may be selected based on Impact Level of Accreditation (which is determined based on the Information Types of the Accreditation digital security boundary defined in an embodiment of the disclosed system or platform (referred to as Security ARMOR by the assignee of the disclosure).

Addressing both the functionality and assurance aspects or characteristics in a set of controls helps to ensure that information technology products and the systems that rely on those products are sufficiently trustworthy. For example, NIST SP 800-60 is a set of documents that provide guidelines and recommendations for the types of information and information systems to be included in each category of potential security impact (where the potential security impact level of an accreditation process is determined based on the information types of the Accreditation digital security boundary defined in Security ARMOR). These guidelines assist government agencies to consistently and uniformly map security impact levels to types of information (e.g., privacy, medical, proprietary, financial, contractor sensitive, trade secret, or investigation, as non-limiting examples), and to information systems (e.g., mission critical, mission support, or administrative purposes, as non-limiting examples).

To protect both information and existing information management systems and applications, before an information system (e.g., a software application) can be developed for an agency, the agency is required to explicitly accept the risk to the agency in terms of its operations (including its mission, functions, image, or reputation, as non-limiting examples), agency assets, or individuals. This is typically achieved via an official agency management decision to authorize development of the software (hereinafter referred to as a process of "accreditation") based on the implementation of an agreed upon set of controls specified in terms of specific standards or regulations adopted by that agency, and/or which the agency is expected to comply with.

As is often the case, a software application may comprise one or more components. Accreditation of the one or more components typically requires implementation of a set of controls, with each control associated with one or more of the software application components, and a corresponding approval from an assessor. Each control of the set of controls is typically associated with a plurality of activities required to pass one or more assessments for implementation of the control. As an example, a set of controls may comprise 400-500 controls (on average) for an accreditation process.

A software developer may be required by an agency to devise a plan for performing implementation and satisfaction of each control. To devise a plan, the developer may need to identify a set of assessment procedures and a set of model activities_(for example, an application component that enables use of templates for project plans). The set of model activities are intended to be performed by the developer to implement each of the set of controls and are typically based on the set of assessment procedures. Each of the controls may require one or more model activities to be performed for an assessment procedure. As would be expected, devising a plan for implementing and verifying 400-500 controls is a procedure that requires a large amount of time and effort.

A developer may also need to identify the relevant controls, based on the information type, by parsing through a corpus of documents issued by an administrative agency (such as NIST). Further, the developer may need to identify assessment procedures and model activities required to implement the relevant controls from the corpus of documents. Finally, the developer may be required to devise a plan for accreditation of the one or more components based on the information obtained from the corpus of documents.

In some cases, one or more of the controls may overlap between the one or more components. This requires that a developer of software implementing the controls implement the overlapping controls repetitively. This results in the accreditation process being even more repetitive, time consuming, and inefficient.

Further, a developer or other participant in an accreditation process may desire to have an efficient way to visualize the software applications or components subject to accreditation, and the status of each accreditation process. Embodiments of the disclosure are directed toward solving these and other problems individually and collectively.

SUMMARY

The terms "invention," "the invention," "this invention," "the present invention," "the present disclosure," or "the disclosure" as used herein are intended to refer broadly to all the subject matter disclosed in this document, the drawings or figures, and to the claims. Statements containing these terms do not limit the subject matter disclosed or the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential, or required features of the claimed subject matter, nor is it intended to be used in isolation to determine the scope of the claimed subject matter. The subject matter should be understood by reference to appropriate portions of the entire specification, to any or all figures or drawings, and to each claim.

In the context of the disclosure, a "Meta Model", "meta model", or "metamodel" is an architectural design component that is used to provide adaptive application features for mission requirements (which may change over time). The Meta Models are designed and implemented as a unique structure that enables automation and orchestration of accreditation life cycle process, digital mapping of security boundary information, and visualization of data outputs including automated generation of documents. The disclosed Meta Models are used by the data, process, and UI layers of the applications for changing use case requirements while an application is in a production state. Meta Models are installed as part of the application in target environments and upgraded/updated with product releases.

In some embodiments, a meta model may comprise one or more of NIST IDs, Control Descriptions, Controls Assessment Criteria, Information Types, Inheritance Applicability, RMF Workflow Steps, Accreditation Life Cycle Logic Attributes, Visual Interface definitions, process customization logic tags, and App Tags used to present context sensitive screens, workflow elements, and automation functions.

In the context of the disclosure, a "digital security boundary" represents one or more security components, elements, or processes (such as networks, servers, APIs, processes, as non-limiting examples) that can be configured and managed to provide a "map" of the security related aspects of a system. In some embodiments, this can be used to replace the static view common to conventional approaches.

In one embodiment, a system and methods for managing an accreditation of software is disclosed. The system may extract raw data from a corpus of documents published by a regulatory organization or agency to define standards for software used by a government agency. The regulatory organization may be the National Institute of Standards and Technology (NIST), or other similar organization. The set of standards may be related to security and/or privacy guidelines for the software used by an agency. The corpus of documents may be segregated into one or more of information type documents, control documents, assessment procedures documents, and model activities documents.

Further, the system may operate to refine the extracted raw data, based on a set of information types selected by a developer/contractor, to generate one or more metamodels. Each metamodel may comprise one or more of a set of information types, a set of controls, a set of assessment procedures, and a set of model activities.

In one non-limiting example, the disclosed system may identify multiple information types from the raw data extracted from a corpus of documents by performing information type mapping. Furthermore, the system may perform controls mapping based on information type mapping and perform assessment procedures mapping based on the control mapping. The system may further implement an accreditation processing flow to manage compliance with a standard or requirement. The accreditation processing flow may include one or more of selecting information types, selecting controls, filtering assessment procedures, reviewing controls compliance, and implementing authorization workload management functions.

In one embodiment, the disclosure is directed to a system for software accreditation workload management using meta models and a portfolio view. The meta models may comprise a set of information types, a set of controls, a set of assessment procedures, and a set of model activities, as a non-limiting example. The meta models may be associated with an accreditation procedure for a software application or a component of an application.

The system may extract a set of model activities associated with a set of controls for an accreditation. Further, the system may recommend a schedule for the model activities (e.g., a baseline project plan) based on a status of the set of controls. Subsequently, the system may receive an input from a developer of a software application related to the schedule of model activities. Further, the system may maintain a data-maps database to assist with the accreditation processes. In one embodiment, the data-maps database may comprise one or more accreditations, applications, plans of action and milestones (POAMs), and meta models. The POAMs may comprise the model activities, a schedule of the model activities, and a status of the model activities.

Further, the system may generate a dashboard to provide a portfolio view for a user and enable the user to more efficiently monitor the progress of a set of accreditation processes. The dashboard may be generated automatically and updated as accreditations are processed. The dashboard may comprise a set of accreditations, a set of applications related to the set of accreditations, the meta models associated with each of the accreditations, the status of model activities for each of the accreditations, and documents generated for each of the accreditations. The system may display the portfolio view for a developer to enable them to manage the accreditation workload and process flow. In one embodiment, the portfolio view may comprise one or more of accreditations, POAMs, and documents generated for each of the accreditations.

Embodiments of the disclosed systems and methods are directed to processes and techniques to support adaptive mission requirements. In some embodiments, this includes architecture components that provide interfaces, code snippets, data structures, and information relationships to enable agility for application features while executing mission critical business processes.

In one embodiment, a method comprising one or more steps, stages, functions, operations, or processes that may be used in performing and managing an accreditation of a software application or software component may include:

Identify a corpus of potentially relevant documents, such as standards for software used by an agency;

In some embodiments, this may be accomplished by performing a search for one or more keywords, phrases, or software component characteristics;

The set of standards may be related to security and privacy (or similar) guidelines for the software used by the agency;

Access the identified corpus of documents;

Identify and extract potentially relevant raw data from one or more documents in the corpus;

In some embodiments, this may be performed using a Natural Language Processing (NLP) technique, a Natural Language Understanding technique (NLU), a large-language-model (LLM), image processing (such as OCR), or other type of trained model;

Refine the extracted raw data;

The refinement of the raw data may include one or more of:

Refine Raw Data Based on a Set of Information Types Selected by a User/Developer;

Identify Security Controls Based on the Set of Information Types;

Identify Assessment Procedures for the Identified Security Controls; and

Identify Model Activities to Implement the Security Controls for the Assessment Procedures;

Model activities are templated baseline project plans that may be integrated into the Accreditation processing; these can be continuously updated in meta models based on agency requirements of how the Accreditation life cycle process is to be executed;

As non-limiting examples, model activities may comprise a review of security assessment requirements, selection of controls, performing implementation testing, performing penetration testing, or seeking approvals;

The raw data may comprise information types, information type categories, security controls families, security controls, security assessment objectives, and a risk management framework process and guidelines. The information types may correspond to a security level or a privacy level of data used by the software or software component. The information type categories may be used to identify an impact level of controls related to the information type. The impact level may be at least one of high, moderate, or low. Further, the security control families may be a set of controls associated with a category of information type;

Perform mapping and/or processing of the contents of one or more of the identified documents to identify one or more of the following that may be contained in a document:

Information type—the information type mapping function may be configured to identify information types from the raw data;

In one embodiment, an administrator may perform information types mapping based on the information types and the information type categories. The information types may correspond to a security level and/or a privacy level of data used by the software;

Further, an administrator may perform control mapping based on the security control families and the security controls. The control mapping may comprise identifying a plurality of security controls associated with the identified information types for the software. The security control families may correspond to potential situations that impact the privacy and/or security of the software during development of the software in accordance with the standards;

Further, an impact level of each security control may be identified. The impact level may indicate a level of each security control in terms of preventing a loss of confidentiality, integrity, or availability. In some embodiments, the impact level may be one of high level, low level, or moderate level;

Controls—the controls mapping may be performed based on the information types. The control mapping process may be configured to identify the plurality of security controls. Further, an assessment procedure mapping may be performed to identify the assessment procedures related to each security control;

Once the plurality of security controls is identified, assessment procedures to check/verify implementation of each of the plurality of controls may be determined based on assessment procedure mapping. The security controls and the security assessment objectives may be used for the assessment procedure mapping;

Assessment procedures based on the information type mapping;

In one embodiment, this mapping and/or processing of the contents may be performed using keyword matching, image processing, word or phrase recognition, or other suitable technique;

In one embodiment, a risk management framework process and guidelines may be used to determine a plan of model activities related to the accreditation of the software. A developer may follow the plan of model activities to implement the plurality of controls such that the plurality of controls passes the assessment procedures;

Form or access one or more meta models from the information and data obtained as a result of the mapping and/or processing (this may be performed as part of the extraction and processing of the raw data from a corpus of documents and/or as part of a separate processing flow);

As mentioned, in the context of the disclosure, a "Meta Model", "meta model", or "metamodel" is an architectural design component that is used to provide adaptive application features for mission requirements (which may change over time). The Meta Models are designed and implemented as a unique structure that enables automation and orchestration of accreditation life cycle process, digital mapping of security boundary information, and visualization of data outputs including automated generation of documents. The disclosed Meta Models are used by the data, process, and UI layers of the applications and processes for changing use case requirements while an application is in a production state. Meta Models are installed as part of the application in target environments and upgraded/updated with product releases, and provide a form of "intelligent" logic for the disclosed system;

In one embodiment, the meta models may comprise one or more of a set of information types, a set of controls, a set of security assessment procedures, and a set of model activities. The form of a meta model may include a set of fields or labels, with each indicating the type or meaning of data associated with the field or label;

In some embodiments, the disclosed system or platform may use accreditation context information from definitions, information types, security controls, assessment results, and contact information and produce all or a portion of a System Security Plan inclusive of predefined static data and system generated dynamic data. As an example, the disclosed processes automatically insert selected information types and security controls selected for the accreditation process;

Generate or develop a plan to perform or execute an efficient accreditation of a software application or component. In one embodiment, this may include one or more of:

Initiate an accreditation process for a specific software application or component;

The accreditation processing may provide assurance of the compliance of software used by an agency to the relevant regulatory bodies and therefore reduces an on-going need for assessment. The accreditation processing may comprise selecting the controls based on the set of information types, identifying the assessment procedures, and determining the impact level of each control from the meta models. In one embodiment, the accreditation processing may be performed by a security professional;

Access one or more meta models relevant to the accreditation process for the software application or component;

Identify one or more accreditation activities in each meta model;

Extract model activities associated with a set of controls from each meta model;

Generate and recommend a schedule for the model activities based on a status of a set of controls associated with a software application or component;

Receive input(s) from user/developer regarding the schedule for the model activities;

Maintain and update a data-maps database comprising one or more of accreditations, applications, components, plans of action and milestones, and meta models;

Generate a dashboard for providing a portfolio view and display to user/developer to assist in managing accreditation workload and processing;

Update a status of one or more activities relevant to an accreditation process.

In one embodiment, the disclosure is directed to a system for implementing and managing a software accreditation process. The system may include a non-transitory computer-readable medium storing a set of computer-executable instructions and an electronic processor or co-processors. When executed by the processor or co-processors, the instructions cause the processor or co-processors (or a device of which they are part) to perform a set of operations that implement an embodiment of the disclosed methods.

In one embodiment, the disclosure is directed to a non-transitory computer-readable medium storing a set of computer-executable instructions, wherein when the set of instructions are executed by an electronic processor or co-processors, the processor or co-processors (or a device of which they are part) performs a set of operations that implement an embodiment of the disclosed methods.

In some embodiments, the systems and methods disclosed herein may provide services through a SaaS or multi-tenant platform. The platform provides access to multiple entities or tenants, each with a separate account and associated data storage. Each account may correspond to a User, set of Users, an entity, a set or category of entities, an agency, a developer, a set or category of Users, a set or category of documents, an industry, or an organization, for example. Each account may access one or more services, a set of which are instantiated in their account, and which implement one or more of the methods or functions disclosed herein.

Other objects and advantages of the systems, apparatuses, and methods disclosed and/or described will be apparent to one of ordinary skill in the art upon review of the detailed description and the included figures. Throughout the drawings, identical reference characters and descriptions indicate similar, but not necessarily identical, elements. While the exemplary embodiments disclosed or described herein are susceptible to various modifications and alternative forms, specific embodiments are shown by way of example in the drawings and are described in detail herein. However, the exemplary or specific embodiments are not intended to be limited to the forms described. Rather, the disclosure covers all modifications, equivalents, and alternatives falling within the scope of the appended claims.

BRIEF DESCRIPTION OF THE DRAWINGS

Embodiments of the disclosure are described with reference to the drawings, in which:

FIG. 1(*b*) a flow chart or flow diagram illustrating a method comprising one or more steps, stages, functions, operations, or processes that may be part of an accreditation workload management process using meta models and a portfolio view, in accordance with an embodiment of the disclosure;

FIG. 2(*b*) is a diagram illustrating the integration of the data sources and processes illustrated in FIG. 2(*a*) with an embodiment of the disclosed system or platform and other components, elements, or processes of that system or platform;

FIG. 3(*b*) is a diagram illustrating a set of components, elements, and processes (that may include a set of steps, stages, operations, or functions) for creating accreditation dashboards and portfolios using data-maps in an embodiment of the disclosed system and methods.

Note that the same numbers are used throughout the disclosure and figures to reference like components and features.

DETAILED DESCRIPTION

Figure 1A:
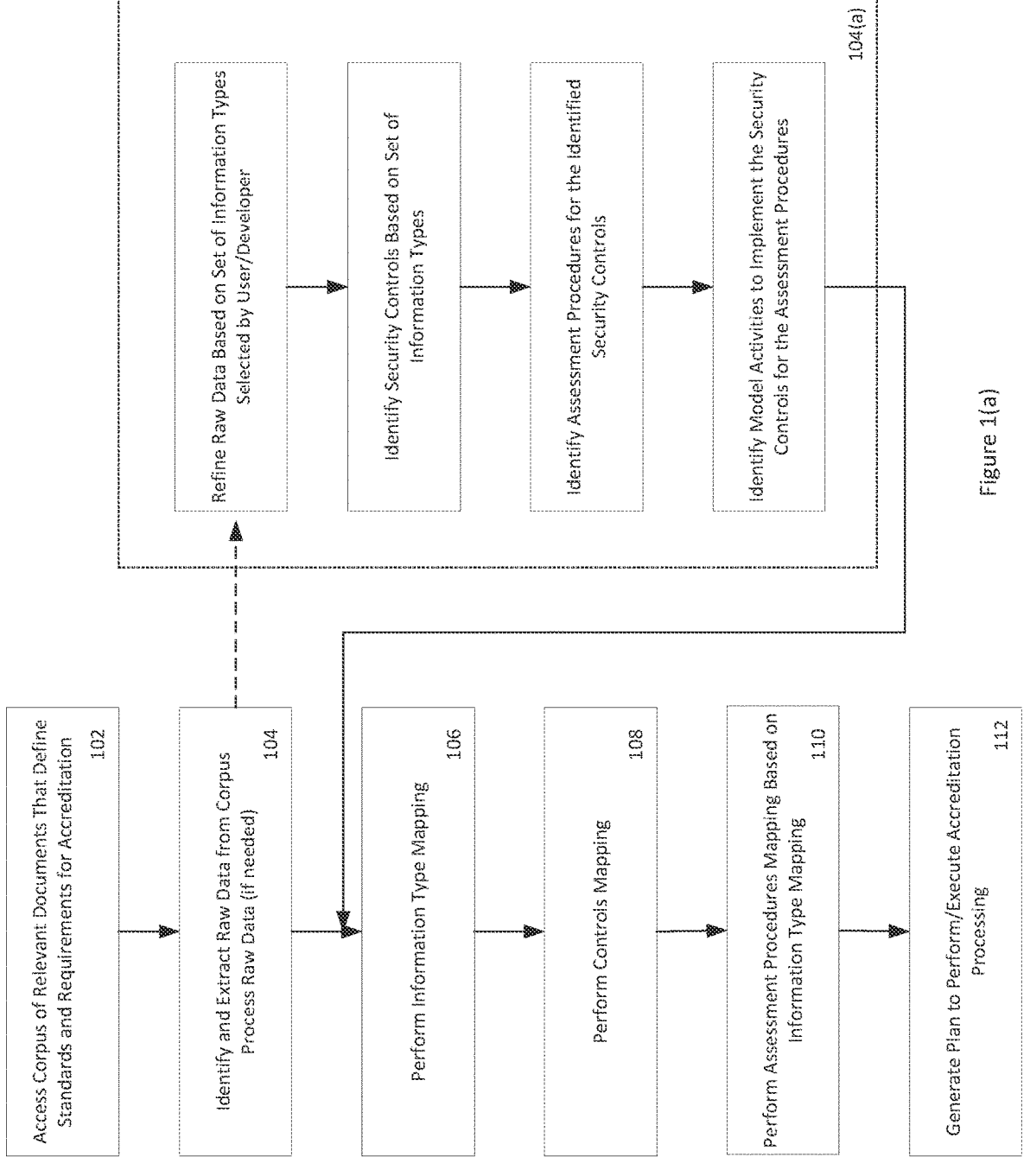
FIG. 1(*a*) is a flow chart or flow diagram illustrating a method comprising one or more steps, stages, functions, operations, or processes that may be part of implementing and managing an accreditation of software, in accordance with an embodiment of the disclosure.

One or more embodiments of the disclosed subject matter are described herein with specificity to meet statutory requirements, but this description does not limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure are described more fully herein with reference to the accompanying drawings, which form a part hereof, and which show, byway of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among others, the subject matter of the disclosure may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods disclosed and/or described herein may be implemented by one or more suitable processing elements (such as a processor, co-processor, microprocessor, CPU, GPU, TPU, QPU, or controller, as non-limiting examples) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory computer-readable data storage elements or media. In one embodiment, the set of instructions may be conveyed to a user through a transfer of instructions or an application that executes a set of instructions (such as over a network, e.g., the Internet). In one embodiment, a set of instructions or an application may be utilized by an end-user through access to a SaaS platform or a service provided through such a platform.

In one embodiment, the systems and methods disclosed and/or described herein may provide services through a SaaS or multi-tenant platform. The platform provides access to multiple entities, each with a separate account and associated data storage. Each account may correspond to a User, set of Users, an entity, a set or category of entities, an agency, a developer, a set or category of Users, a set or category of documents, an industry, or an organization, for example. Each account may access one or more services, a set of which are instantiated in their account, and which implement one or more of the methods or functions disclosed herein.

In one embodiment, one or more of the operations, functions, processes, or methods disclosed and/or described herein may be implemented by a specialized form of hardware, such as a programmable gate array, application specific integrated circuit (ASIC), or the like. Note that an embodiment of the disclosure may be implemented in the form of an application, a sub-routine that is part of a larger application, a "plug-in", an extension to the functionality of a data processing system or platform, or other suitable form. The following detailed description is, therefore, not to be taken in a limiting sense.

Embodiments of the disclosure are directed to systems and methods for implementing and managing an accreditation of a software application or a software component used by a government agency, in accordance with the standards specified by a regulatory organization (such as NIST).

Examples of the software may include a system that is used for routine administrative and business applications, for example, payroll, finance, logistics, or personnel management applications. The standards or requirements may be described in one or more documents contained in a corpus of documents.

In some cases, a developer may be required to devise a plan for accreditation of one or more software components. As an example, the plan may comprise the relevant controls associated with the accreditation process, and the assessment procedures and model activities required to implement the relevant controls. The developer may be required to devise such a plan for accreditation of each software application or component they are proposing to provide to an agency.

In some embodiments, the disclosed system and methods may improve efficiency and speed of implementing controls for accreditations. In some embodiments, the system may help in organizing documents related to standards. In some embodiments, the system may save time by identifying implemented controls from one or more previously approved components. In some embodiments, the system may automatically generate documents required for an accreditation using data from one or more meta models.

An embodiment of the disclosed system may extract raw data from a corpus of documents published by a regulatory organization to define standards for software used by a government agency. The set of standards may be related to security and privacy guidelines for the software used by an agency. In one embodiment, the disclosed systems and methods may operate to identify a set of controls and assessment procedures imposed by one or more standards. The corpus of documents may be segregated, indexed, or arranged into one or more categories. Non-limiting examples of such categories include information type documents, control documents, assessment procedures documents, and model activities documents (NIST SP 800-60, NIST FIPS, NIST 800-53, as examples).

Further, the disclosed system may refine raw data extracted from the corpus, based on a set of information types selected by a developer/contractor, and use that data to generate one or more meta models. The meta models may comprise the set of information types, a set of controls, a set of assessment procedures, and a set of model activities. In one embodiment, the system may identify multiple information types from the raw data by performing information type mapping. Furthermore, the system may perform controls mapping based on information type mapping, and assessment procedures mapping based on the control mapping. The system may further perform an accreditation processing to manage standards. The accreditation processing may comprise selecting information types, selecting controls, filtering assessment procedures, and reviewing controls compliance and authorization workload management operations.

In one embodiment, the disclosed system may generate one or more meta models, with each such meta model associated with one of the unapproved software components. The meta models may be generated, at least in part, from the corpus of documents based on the accreditation information. A meta model may also be generated (in part or in whole) from information obtained from a source other than the developer (such as a repository of documents generated by one or more agencies, regulatory bodies, or standards defining associations).

In one embodiment, the meta models may comprise one or more of a set of information types, a set of controls, a set of security assessment procedures, and a set of model activities. The form of a meta model may include a set of fields or labels, with each indicating the type or meaning of data associated with the field or label. The disclosed system may extract a set of model activities, associated with a set of controls from the corpus of documents, for the accreditation of an application or a software component. Further, the system may recommend a schedule for the model activities based on a status of one or more of the set of controls.

Subsequently, the disclosed system may receive an input, from a developer, related to the schedule for the model activities. The developer may be required to perform the model activities to configure one or more of the set of controls for the software application or component assessment procedures.

In the context of the disclosure and as a non-limiting example, model activities may refer to templated baseline project plans that are integrated into the accreditation processing. These can be updated using the disclosed meta models based on agency requirements related to how the accreditation process should be executed and its corresponding life cycle.

Embodiments of the disclosure are also directed to systems and methods for software accreditation workload management using meta models and a portfolio view. The meta models may comprise a set of information types, a set of controls, a set of assessment procedures, and a set of model activities. The meta models may be associated with accreditations required to comply with one or more standards for a software application or component used by a government agency. The application or component may be developed by independent developers.

The standards may be defined to avoid or contain risks regarding the security and privacy of data used by the application. The standards may be defined by a regulatory organization such as National Institute of Standards and technology (NIST). The regulatory organization may define the standards using a corpus of documents. The corpus of documents may be segregated into information type documents, control documents, assessment procedures documents, and model activities documents.

An identified and accessed corpus of documents may contain information and data relevant to an accreditation process and be segregated into information type documents, control documents, assessment procedures documents, and model activities documents. In one embodiment, the disclosed systems and methods identify a set of controls and assessment procedures imposed by one or more standards from the corpus of documents.

In one embodiment, the disclosed system may generate and display a portfolio view comprising information regarding accreditation processing for a software application. The portfolio view may differ based on a persona of a user or a level of access granted to a user. In one embodiment, a persona may be a role (or access level) of a user accessing a system of an agency that utilizes the software application or component.

The role may be one of a developer, an ISSO (Information System Security Officer), or a security manager, as non-limiting examples. Each role may be associated with a set of permissions that are applicable when accessing the agency system. A permission may be one or more of accessing an accreditation, modifying an accreditation, changing a status of an accreditation process, or accessing a resource, as non-limiting examples. The portfolio view may comprise a dashboard that is constructed and/or modified automatically when an accreditation is being processed or has completed being processed.

Conventionally, a dashboard may be structured to display the applications and/or components first and thus present information in an application-centric manner. With this approach, a developer may be able to view (a) the number of applications and/or components to be accredited, (b) the stage of the accreditation process for each of the applications or components, and (c) the type of resources stored or available for the applications or components (such as servers, databases, and similar types of resources).

Upon selecting an application or component, a list of accreditation processes that are ongoing for the application or component may be displayed. Each accreditation process in the list may be associated with a plurality of model activities, and each model activity may be associated with a plurality of resources. However, this conventional way of organizing and displaying relevant accreditation information may be confusing to a developer and necessitate duplicative and time-consuming tasks to develop an accreditation schedule and/or monitor an accreditation process.

In contrast, one or more embodiments of the disclosure generate and display a dashboard in an accreditation-centric way in which the applications related to the accreditations, the meta models associated with the accreditations, the status of the model activities associated with the accreditations, and resources generated for the accreditations may be accessed and viewed more efficiently. Because accreditations that are currently ongoing represent the lowest common denominator in a system designed to track accreditations, one may consider such an accreditation-centric model as representing information building and presentation in a "bottom-up" approach. Thus, upon selecting an accreditation process, one or more applications or components undergoing the accreditation process may be displayed, and a developer may easily select an application based on its status in an accreditation process.

Advantageously, such a bottom-up view helps a developer to access and view all applications or components undergoing an accreditation process, the stage of the accreditation process for each of the applications or components, and the resources associated with an application or component. The bottom-up view may simplify access to information regarding the accreditation process, thereby assisting a developer in devising a plan for the accreditation process for an application or component.

In some embodiments, the disclosed system may maintain a data-maps database. The data-maps database may comprise one or more of the accreditations (and/or the status of one or more accreditation processes), a software application and/or the components requiring accreditation, a plan of action and milestones (POAMs), and the associated meta models. The POAMs may comprise one or more of the model activities, the schedule of the model activities, and a status of the model activities.

A data-maps database may serve to connect compliance and information relationships for accreditations, applications (or components), and associated activities. An embodiment of the disclosed system may therefore allow a developer to view an integrated security status with real-time relationships to the data-maps database. The data-maps database may be implemented and configured to establish connections among multiple accreditations, applications or components, POAMs, resources, and documents to enable generation of a complete and more useful dashboard or display. As a non-limiting example, an embodiment may enable a developer to efficiently manage an accreditation workload and reduce the time of a typical accreditation process from 6 months to 3 months.

FIG. 1(a) is a flow chart or flow diagram illustrating a method comprising one or more steps, stages, functions, operations, or processes that may be part of implementing and managing an accreditation of software, in accordance with an embodiment of the disclosure. In one embodiment, a method comprising one or more steps, stages, functions, operations, or processes that may be used in performing and managing an accreditation of a software application or software component may include:

Identify a corpus of potentially relevant documents, such as standards for software used by an agency (as suggested by step or stage 102);

In some embodiments, this may be accomplished by performing a search for one or more keywords, phrases, or software component characteristics;

The set of standards may be related to security and privacy (or similar) guidelines for the software used by the agency;

Access the identified corpus of documents (step or stage 102);

Identify and extract potentially relevant raw data from one or more documents in the corpus (step or stage 104);

In some embodiments, this may be performed using a Natural Language Processing (NLP) technique, a Natural Language Understanding technique (NLU), a large-language-model (LLM), image processing (such as OCR), or other type of trained model;

Refine the extracted raw data. As suggested by steps or stages contained in the box labeled 104(a), refinement of the raw data may include one or more of:

Refine Raw Data Based on Set of Information Types Selected by a User/Developer;

The raw data may be refined, based on a set of information types selected by a developer/contractor, to generate one or more meta models. Once the security controls are identified, the assessment procedures for each control may be determined based on the meta models. Further, model activities, to implement the security controls for the assessment procedures, may be identified;

Identify Security Controls Based on the Set of Information Types;

The set of security controls, associated with an information type(s) in the meta models, may be identified. In one embodiment, the raw data may be analyzed by a platform automation engine to identify the security controls associated with the set of information types, from the meta models;

Identify Assessment Procedures for the Identified Security Controls; and

Identify Model Activities to Implement the Security Controls for the Assessment Procedures;

Model activities are templated baseline project plans that may be integrated into the Accreditation processing; these can be continuously updated in meta models based on agency requirements of how the Accreditation life cycle process is to be executed;

In one aspect, the raw data may comprise information types, information type categories, security controls families, security controls, security assessment objectives and a risk management framework process and guidelines. The information types may correspond to a security level, or a privacy level of data used by a software application or component. The information type categories may be used to identify an impact level of controls related to the information type. The impact level may be one of high, moderate, or low. Further, the security control families may be a set of controls associated with a category of information type;

The security control families may correspond to potential situations that impact the privacy and/or security of the software during development of the software in accordance with the standards. The security controls may correspond to a countermeasure prescribed for the software designed to protect the confidentiality, integrity, and availability of information, and to meet a set of defined security requirements. Subsequently, the security assessment objectives may indicate a goal of each assessment procedure used to assess the implementation of a security control. The assessment procedure may be a set of steps to be followed to check implementation of a security control. Further, the risk management framework process and guidelines may provide information regarding security standards and guidelines for implementation of information system security;

Perform mapping and/or processing of the contents of one or more of the identified documents to identify one or more of the following that may be contained in a document:

Information type (as suggested by step or stage 106)— the information type mapping function may be configured to identify information types from the raw data;

In one embodiment, an administrator may perform information types mapping based on the information types and the information type categories. The information types mapping may correspond to identifying multiple information types from the raw data associated with the software being accredited. The information types may correspond to a security level and/or a privacy level of data used by the software;

Further, an administrator may perform control mapping based on the security control families and the security controls. The control mapping may comprise identifying a plurality of security controls associated with the identified information types for the software. The plurality of security controls may correspond to potential situations that may impact the privacy and security of the software;

Further, an impact level of each security control may be identified. The impact level may indicate a level of each security control in terms of preventing a loss of confidentiality, integrity, or availability. In some embodiments, the impact level may be one of high level, low level, or moderate level;

Controls (as suggested by step or stage 108)—the controls mapping may be performed based on the information types. The control mapping process may be configured to identify the plurality of security controls. Further, an assessment procedure mapping may be performed to identify the assessment procedures related to each security control;

Once the plurality of security controls is identified, assessment procedures to check/verify implementation of the plurality of controls may be determined based on assessment procedure mapping.

The security controls and the security assessment objectives may be used for the assessment procedure mapping. The assessment procedures may help to determine which controls are implemented correctly, operating as intended, and producing a desired outcome with respect to meeting the security requirements for the system in which the software or component will be installed and operate;

Assessment procedures based on the information type mapping (as suggested by step or stage 110);

In one embodiment, this mapping and/or processing of the corpus contents may be performed using keyword matching, image processing, word or phrase recognition, or other suitable technique;

In one embodiment, a risk management framework process and guidelines may be used to determine a plan of model activities related to the accreditation of the software. A developer may follow the plan of model activities to implement the plurality of controls such that the plurality of controls passes the assessment procedures;

Form or access one or more meta models from the information and data obtained as a result of the mapping and/or processing (this may be performed as part of the extraction and processing of the raw data from a corpus of documents and/or as part of a separate processing flow);

As mentioned, in the context of the disclosure, a "Meta Model", "meta model", or "metamodel" is an architectural design component that is used to provide adaptive application features for mission requirements (which may change over time). The disclosed Meta Models are used by the data, process, and UI layers of the applications for changing use case requirements while an application is in a production state. Meta Models are installed as part of the application in target environments and upgraded with product releases;

In one embodiment, the meta models may comprise one or more of a set of information types, a set of controls, a set of security assessment procedures, and a set of model activities. The form of a meta model may include a set of fields or labels, with each indicating the type or meaning of data associated with the field or label;

Generate or develop a plan to perform or execute an efficient accreditation of a software application or component (as suggested by step or stage 112). In one embodiment, this may include one or more of (as suggested by the process flow illustrated in FIG. 1(*b*):

Initiate an accreditation process for a specific software application or component;

The accreditation processing may provide assurance of the compliance of software used by an agency to the relevant regulatory bodies and therefore reduces an on-going need for assessment. The accreditation processing may comprise selecting the controls based on the set of information types, identifying the assessment procedures, and determining the impact level of each control from the meta models. In one embodiment, the accreditation processing may be performed by a security professional;

Access one or more meta models relevant to the accreditation process for the software application or component (as suggested by step or stage 120);

Identify one or more accreditation activities in each meta model;

Extract model activities associated with a set of controls from each meta model;

Generate and recommend a schedule for the model activities based on a status of a set of controls associated with a software application or component (as suggested by step or stage 122);

Receive input(s) from a user/developer regarding the schedule for the model activities (as suggested by step or stage 124);

Maintain and update a data-maps database comprising one or more of accreditations, applications, components, plans of action and milestones, and meta models (as suggested by step or stage 126); and Generate a dashboard for providing a portfolio view and display to a user/developer to assist in managing accreditation workload and processing (as suggested by step or stage 128);

Update a status of one or more activities relevant to an accreditation process.

In one embodiment, a platform automation engine (as shown in FIGS. 2(*b*) and 3(*b*)) may operate to refine the extracted raw data based on a set of information types associated with a software application or component. The set of information types may be selected by a developer/contractor.

In some embodiments, the platform automation engine may be configured to generate one or more meta models by extracting relevant sets of controls (based on the set of information types) from the refined raw data. The meta models may comprise one or more of a set of controls, a set of information types, a set of model activities, and a set of assessment procedures. Further, the disclosed system may identify security controls based on the set of information types. Furthermore, the disclosed system may determine an impact level of each security control. The impact level may be determined based on the set of information types. Subsequently, the disclosed system may identify assessment procedures to assess the security controls, and model activities to be performed in regard to the assessment procedures.

FIG. 2(*a*) is a diagram illustrating a set of components, elements, and processes (that may include a set of steps, stages, operations, or functions) for implementing an embodiment of the disclosure. As shown in the figure, a set of Raw Standards Data is accessed or otherwise obtained by an embodiment of the disclosed system or platform. The standards and associated accreditation process information are identified, cleansed (if needed), formatted, related, and/or otherwise prepared for import into one or more meta models stored in a metadata database.

The prepared standards data and process information are then subjected to processing to map families and information assurance levels (typically expressed as low, medium, or high) for controls selection. Controls may be organized by NIST (or other agency) ID and Assurance levels to enable an automated selection process. Controls and Assurance levels may then be assembled or combined to generate Assessment Procedures.

The previous processing produces one or more of the following types or categories of data or information:

Control Sets—a set of controls that can be used for an accreditation process or task;

Activity Sets and Model Activities—a set of predefined activities for baseline project loading;

Info Types—information types for impact level determination;

Assessment procedures—assessment guidelines available from NIST (or another agency) for use in accreditation processing.

One or more of the types or categories of data or information are then used as part of an accreditation process. In some embodiments, the disclosed accreditation process flow allows the user to define security boundaries digitally by selecting one or more systems, supporting resources, characteristics, and information types for automatically calculating the accreditation impact level, loading controls, and facilitating the overall accreditation authorization process.

Figure 2A:
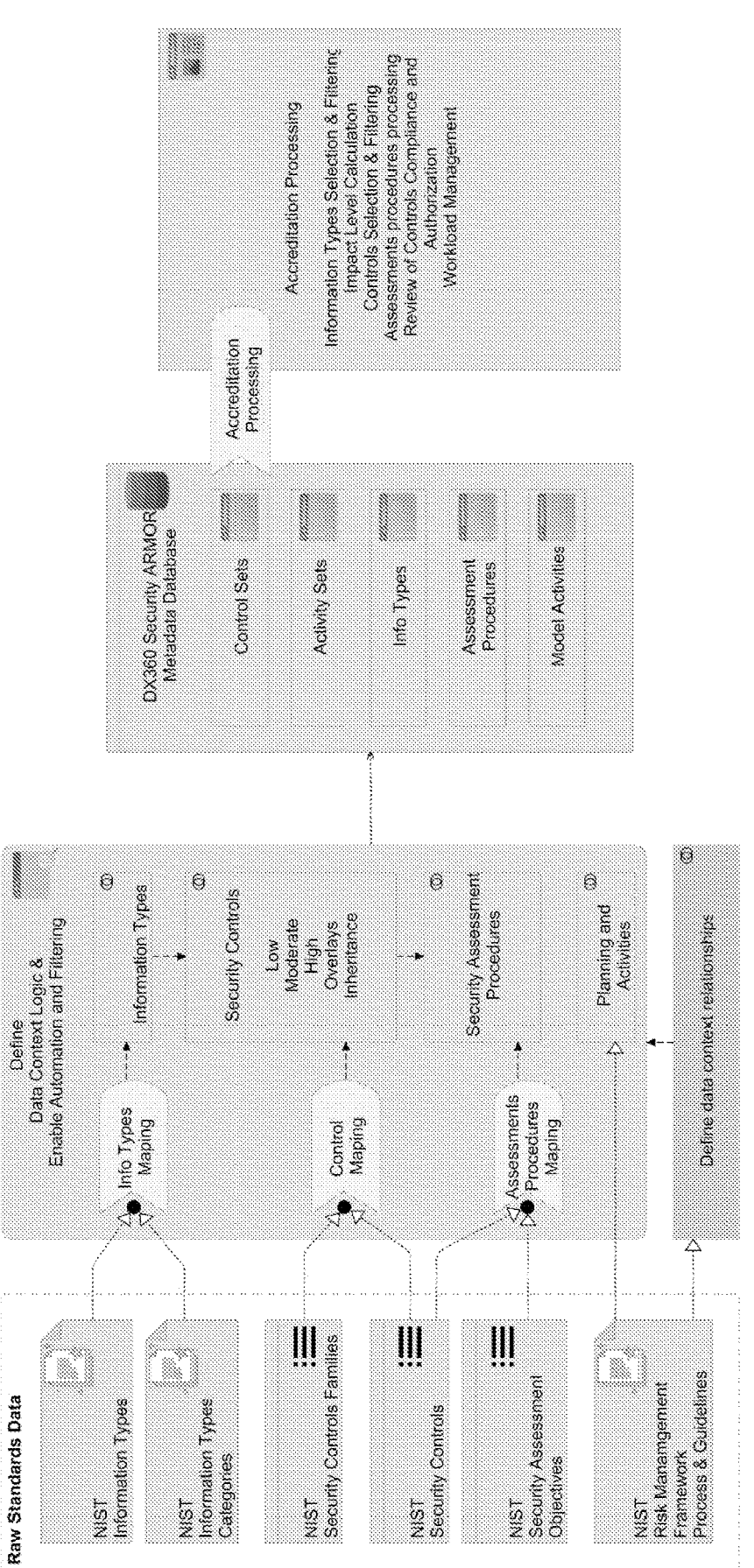
FIG. 2(*a*) is a diagram illustrating a set of components, elements, and processes (that may include a set of steps, stages, operations, or functions) for implementing an embodiment of the disclosure. As shown in the figure, a set of Raw Standards Data is accessed or otherwise obtained by an embodiment of the disclosed system or platform. The standards and associated accreditation process information are identified, cleansed (if needed), formatted, related, and otherwise prepared for import into one or more meta models stored in a metadata database.
Figure 2B:
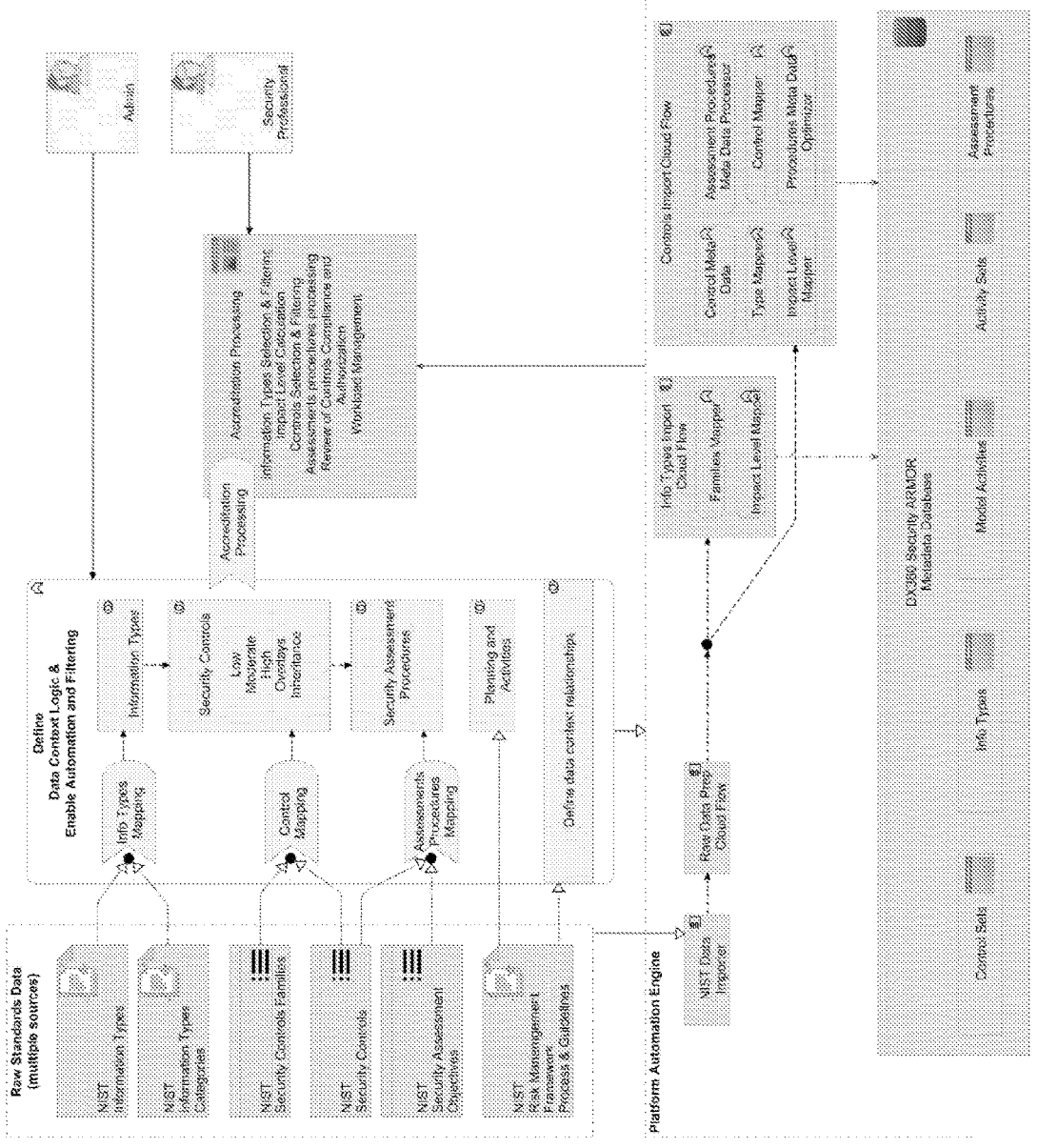

FIG. 2(b) is a diagram illustrating the integration of the data sources and processes illustrated in FIG. 2(a) with an embodiment of the disclosed system or platform and other components, elements, or processes of that system or platform. As shown in the figure, in one embodiment, a Platform Automation Engine may be used. Such an automation engine may perform one or more of the following processes, operations, or functions:

NIST Data Importer & Raw Data Prep Cloud flow— prepares raw data from sources and formats it for meta model loading and imports the prepared data;

Info Types Cloud flow—maps information types families to the raw data along with impact levels;

Controls Import Cloud Flow—imports raw data from NIST (or other agency) sources and formats it for meta model loading by relating impact levels, procedures, guidelines, and additional application user experience tags;

Metadata Database—persists configuration, standards, accreditation, and meta models data to enable overall system features.

Figure 3A:
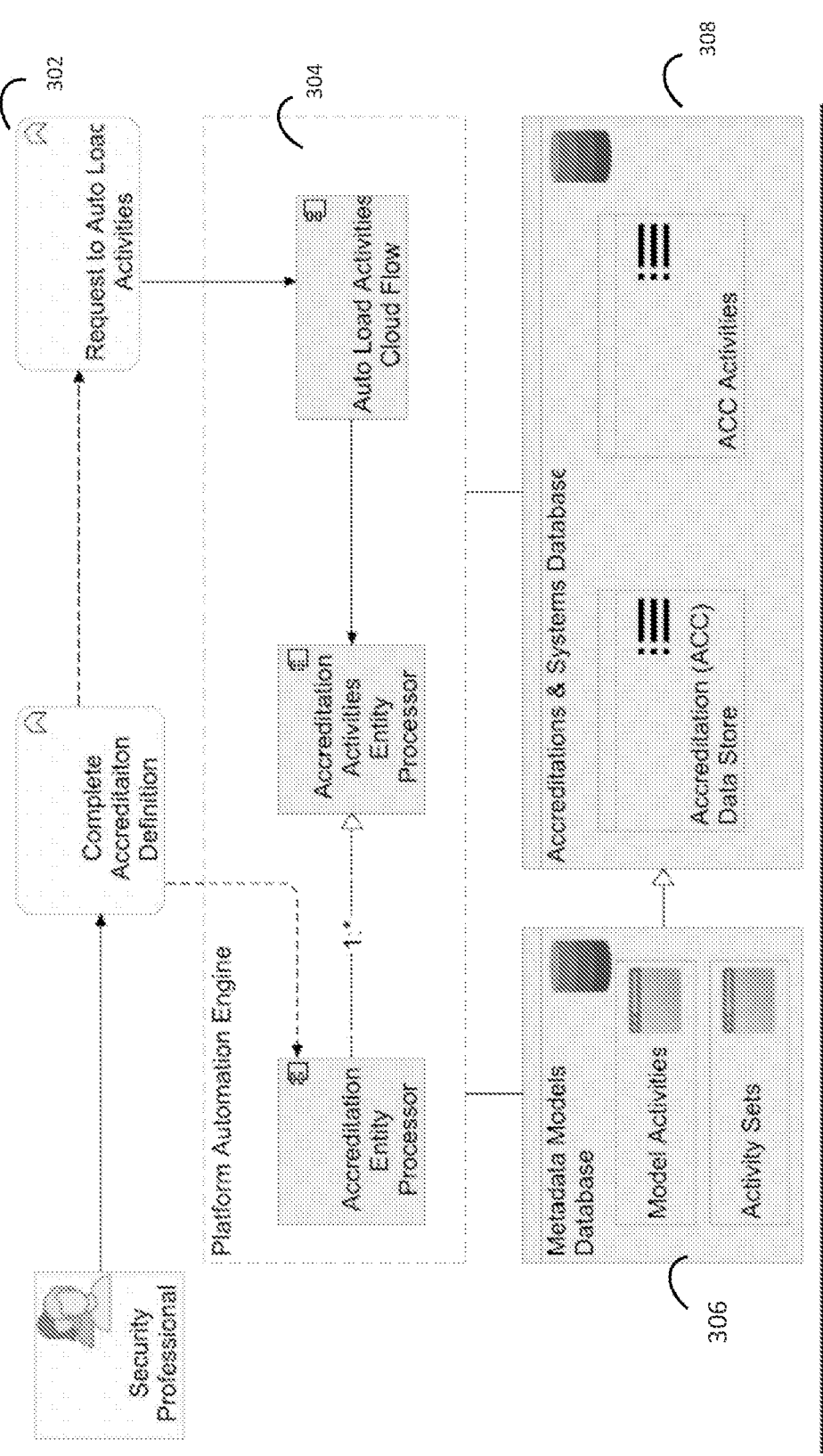
FIG. 3(*a*) is a diagram illustrating a set of components, elements, and processes (that may include a set of steps, stages, operations, or functions) for implementing an embodiment of the disclosure.

FIG. 3(a) is a diagram illustrating a set of components, elements, and processes (that may include a set of steps, stages, operations, or functions) for implementing an embodiment of the disclosure. As shown in the figure:

At block 302, an automated schedule of model activities may be requested;

As an example, a user may complete or select the Accreditation process context information and request the disclosed system to load a set of relevant activities;

At block 304, a schedule for model activities may be calculated using one or more meta models accessed from a metadata model database (as suggested by element or component 306);

In one embodiment, metadata models database 306 may include a set of model activities and corresponding activity sets (where these are components of the disclosed system);

In one embodiment, the disclosed system's Platform Automation Engine identifies the proper model activity set and loads the activities based on the information in the meta models;

At block 308, model activities for a set of controls of an accreditation may be extracted by the disclosed system;

In one embodiment, a set of time phased data of activities and activity status are maintained in meta-data models database 306 for baseline activities. Activity sets may be used to group model activities for specific authorization type use cases. Model activities are autoloaded to an accreditation process for processing and workload management where a security professional can track and manage accreditation progress for a software application or component.

Figure 3B:
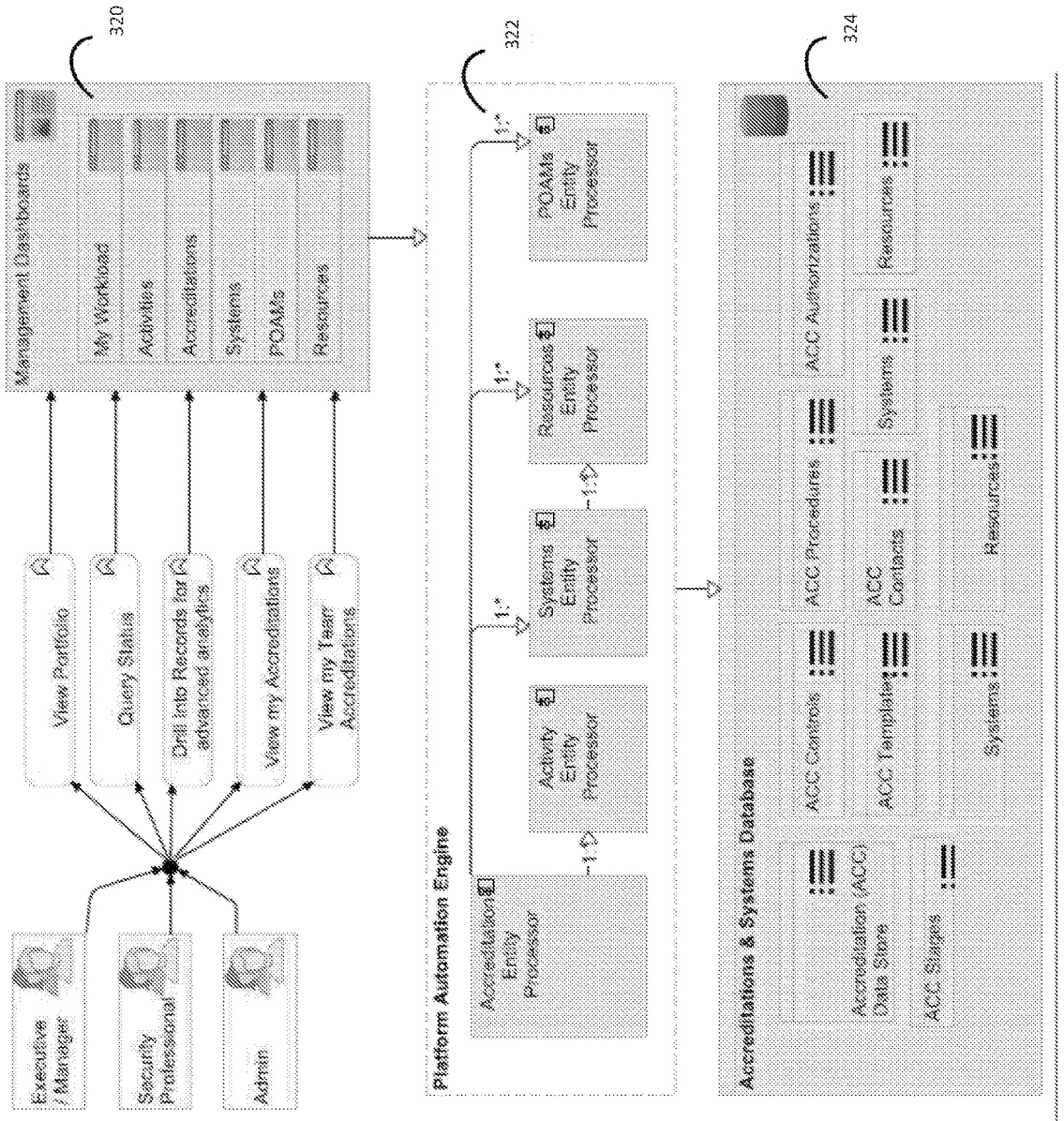

FIG. 3(b) is a diagram illustrating a set of components, elements, and processes (that may include a set of steps, stages, operations, or functions) for creating accreditation dashboards and portfolios using data-maps in an embodiment of the disclosed system and methods. As shown in the figure:

At block 320, a dashboard may be created, using a data-maps database (as suggested by element or component 324, to provide a portfolio view to a user;

An embodiment of the disclosed system may provide Persona-based (Executive, Manager, Admin, . . . etc.) dashboard generation and display using a set of data filters to deliver a portfolio view of the status of on-going or previously performed accreditations;

At block 322, a Platform (or System) Automation Engine continuously processes Activity, System, Resource, and POAM data to make such data and information available for Portfolio views based on data relationships, security, and status of the data;

At block, 324, a data-maps database may be maintained;

In one embodiment, the disclosed system or platform provides time phased accreditations information storage in a database 324. This may include a digital map of security boundary information generated by grouping relation information in a structure that supports automation and reuse (as disclosed herein). This eliminates the need to maintain multiple documents and prevents fragmentation of the information across multiple sources and storage environments (databases, word/excel documents, etc.);

Activity sets may be used to group model activities for specific authorization type use cases. Model activities are autoloaded to an accreditation process for processing and workload management where a security professional can track and manage accreditation progress for a software application or component.

One or more of the exemplary embodiments discussed and/or described herein may provide certain advantages and benefits. Though not required to practice aspects of the disclosure, these advantages and benefits may include those provided by the following features or aspects of an embodiment:

the disclosed system may improve efficiency and speed of accessing documents and managing controls for accreditations;

the disclosed system may help in organizing documents related to accreditations; and the disclosed system may provide an efficient view of accreditations and applications related to the accreditations.

Figure 4:
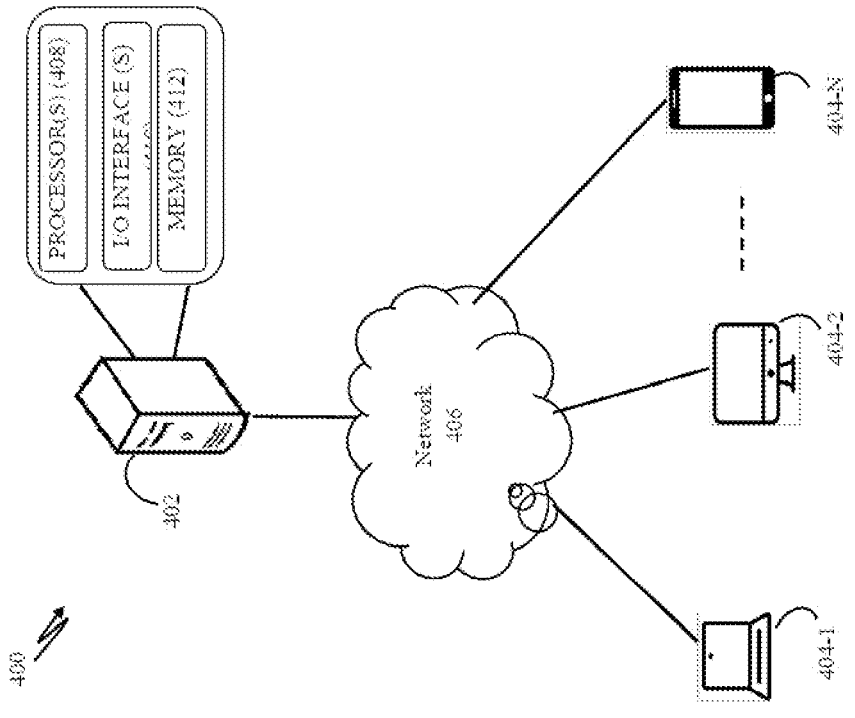
FIG. 4 illustrates a network implementation of a system for accreditation workload management using meta models and a portfolio view, in accordance with an embodiment of the disclosure.

Referring to FIG. 4, a network implementation 400 of a system 402 for managing an accreditation of software is disclosed. It may be noted that one or more users may access the system 402 through one or more user devices 404-1, 404-2 . . . 404-N, collectively referred to as user devices 404, hereinafter, or applications residing on the user devices 404.

Although the disclosure is explained considering that the system 402 is implemented on a server, it may be understood that the system 402 may be implemented in other forms of a computing device or system, such as a laptop computer, a desktop computer, a notebook, a workstation, a virtual environment, a mainframe computer, a server, a network server, or a cloud-based computing environment. It will be understood that the system 402 may be accessed by multiple users through one or more user devices 404-1, 404-2 . . . 404-N.

In one implementation, the system 402 may comprise a cloud-based computing environment in which the user may operate individual computing systems configured to execute remotely located applications. Examples of the user devices 404 may include, but are not limited to, a portable computer, a personal digital assistant, a handheld device, and a workstation. The user devices 404 are communicatively coupled to the system 402 through a network 406.

In one implementation, the network 406 may be a wireless network, a wired network, or a combination thereof. The network 406 may be implemented as one of several different types of networks, including but not limited to an intranet, local area network (LAN), wide area network (WAN), or the Internet. The network 406 may be a dedicated network or a shared network. A shared network represents an association of different types of networks that use a variety of protocols, for example, Hypertext Transfer Protocol (HTTP), Transmission Control Protocol/Internet Protocol (TCP/IP), or Wireless Application Protocol (WAP) to communicate with one another. Further, the network 406 may include a variety of network devices, including routers, bridges, servers, computing devices, or storage devices.

In one embodiment, system 402 may include at least one processor 408, an input/output (I/O) interface 410, and a memory 412. Processor 408 may be implemented as one or more microprocessors, microcomputers, microcontrollers, digital signal processors, Central Processing Units (CPUs), state machines, logic circuitries, and/or devices that manipulate signals based on operational instructions. Among other capabilities, the at least one processor 408 is configured to fetch and execute computer-readable instructions stored in the memory 412.

The I/O interface 410 may include a variety of software and hardware interfaces, for example, a web interface, a graphical user interface, and the like. The I/O interface 410 may allow the system 402 to interact with the user directly or through the client devices 404. Further, the I/O interface 410 may enable the system 402 to communicate with other computing devices, such as web servers and external data servers (not shown). The I/O interface 410 can facilitate communications and data transfer within a wide variety of networks and protocol types, including wired networks (for example, LAN or cable) and wireless networks (such as WLAN, cellular, or satellite). The I/O interface 410 may include one or more ports for connecting a number of devices to one another or to another server.

The memory 412 may include a computer-readable medium or computer program product. Non-limiting examples include volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 412 may include routines, programs, objects, instructions, modules, components, or data structures which perform particular tasks or implement particular abstract data types. The memory 412 may include programs or instructions that supplement applications and functions of the system 402. In one embodiment, the memory 412 may serve as a repository for storing data processed, received, and generated by one or more of the programs or the coded instructions.

As there are various challenges observed in the existing art, the challenges necessitate the need to build the system 402 for generating meta models. At first, a user may use the user device 404 to access the system 402 via the I/O interface 410. The user may register the user devices 404 using the I/O interface 410 to use the system 402. In one aspect, the user may access the I/O interface 410 of the system 402. The detail functioning of the system 402 is disclosed and/or described herein.

In one embodiment, the system 402 may be used to execute a method disclosed and/or described herein. The system 402 may import raw data from a plurality of data sources. The raw data may be referred to as unstructured data. The plurality of data sources may comprise NIST platform and the like. Further, the system 402 may define a context of the raw data. In one aspect, the system 402 may determine multiple information types associated with the raw data. Based on the information types, the system 402 may perform controls mapping and assessment procedures mapping. Further, the system 402 may execute one or more portions of an accreditation process.

In one embodiment, the system 402 may create meta models. The meta models may be used to understand the raw data and determine a set of controls and a set of assessment procedures for the raw data.

Exemplary embodiments discussed herein may provide certain advantages. These advantages may include those provided by the disclosed and/or described features. In some embodiments, the system may improve efficiency and speed of implementing controls for accreditations. In some embodiments, the system may help in organizing documents related to standards.

Although implementations for a system and method for accreditation workload management using meta models and a portfolio view have been described in terms of specific structural features and/or methods, the appended claims are not necessarily limited to the specific features or methods described. Rather, the specific features and methods are disclosed as examples of implementations for accreditation workload management using meta models and a portfolio view.

It should be understood that the present invention as described above can be implemented in the form of control logic using computer software in a modular or integrated manner. Based on the disclosure and teachings provided herein, a person of ordinary skill in the art will know and appreciate other ways and/or methods to implement an embodiment of the disclosure using hardware or a combination of hardware and software.

Any of the software components, processes or functions described in this application may be implemented as software code to be executed by a processor using any suitable computer language such as Python, Java, JavaScript, C, C++, or Perl using procedural, functional, object-oriented, or other techniques. The software code may be stored as a series of instructions, or commands in (or on) a non-transitory computer-readable medium, such as a random-access memory (RAM), a read only memory (ROM), a magnetic medium such as a hard-drive, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a flash memory, a USB flash drive, an external hard disk drive, thumb drive, pen drive, key drive, a High-Density Digital Versatile Disc (HD-DV D) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology, or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, may be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that may direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein may be performed in any suitable order unless otherwise indicated herein or clearly contradicted by context. The use of all examples, or exemplary language (e.g., "such as") provided herein, is intended merely to better illuminate embodiments of the disclosure and do not pose a limitation to the scope of the invention unless otherwise claimed. No language in the specification should be construed as indicating any non-claimed element as essential to each embodiment of the present invention.

The words "receiving", "generating", "extracting", "determining", and "calculating," and other forms thereof, are intended to be open ended in that an item or items following any one of these words is not meant to be an exhaustive listing of such item or items or meant to be limited to only the listed item or items.

As used herein (i.e., the claims, figures, and specification), the term "or" is used inclusively to refer to items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below. The disclosed embodiments are merely exemplary of the disclosure, which may be embodied in various forms.

What is claimed is:

1. A method, comprising:
   identifying a corpus of documents describing one or more standards for software used by an agency;
   accessing the identified corpus of documents;

identifying and extracting relevant data from one or more documents in the corpus, wherein the relevant data comprises one or more of information types, information type categories, security controls families, security controls, security assessment objectives, and a risk management framework process and guidelines;

refining the extracted data, wherein refining the data further comprises identifying one or more security controls based on a set of information types provided by a software developer, identifying one or more assessment procedures for the identified security controls, and identifying one or more model activities used to implement the security controls for the assessment procedures;

forming or accessing one or more meta models based on the information and data obtained as a result of the refining of the extracted data, wherein a meta model comprises one or more of a set of information types, a set of controls, a set of security assessment procedures, and a set of model activities;

generating a plan to perform or execute an accreditation of a software application or component, wherein generating the plan further comprises accessing one or more meta models relevant to the accreditation process for the software application or component, identifying one or more accreditation activities in each meta model, extracting model activities associated with a set of controls from each meta model, and generating a recommended schedule for the model activities based on a status of a set of controls associated with the software application or component;

automating an accreditation life cycle process using the one or more meta models; and generating a dashboard to provide a portfolio view and display for the developer to assist in managing accreditation workload and processing.

2. The method of claim 1, wherein the corpus of documents was prepared by a standards setting or regulatory organization.

3. The method of claim 1, wherein the set of model activities comprise one or more of a review of security assessment requirements, selection of controls, performing implementation testing, performing penetration testing, or seeking approvals.

4. The method of claim 1, wherein the software application component is intended for use in an administrative process of the agency.

5. The method of claim 4, wherein the administrative process is one or more of payroll, finance, logistics, or personnel management.

6. The method of claim 1, wherein identifying and extracting relevant data from one or more documents in the corpus further comprises one or more of using a Natural Language Processing (NLP) technique, a Natural Language Understanding technique (NLU), a large-language-model (LLM), or image processing.

7. The method of claim 1, further comprising maintaining a data-maps database including one or more of accreditations, applications, components, plans of action and milestones, and meta models.

8. A system, comprising:

one or more electronic processors configured to execute a set of computer-executable instructions; and the set of computer-executable instructions, wherein when executed, the instructions cause the one or more electronic processors to:

identify a corpus of documents describing one or more standards for software used by an agency;

access the identified corpus of documents;

identify and extract relevant data from one or more documents in the corpus, wherein the relevant data comprises one or more of information types, information type categories, security controls families, security controls, security assessment objectives, and a risk management framework process and guidelines;

refine the extracted data, wherein refining the data further comprises identifying one or more security controls based on a set of information types provided by a software developer, identifying one or more assessment procedures for the identified security controls, and identifying one or more model activities used to implement the security controls for the assessment procedures;

form or access one or more meta models based on the information and data obtained as a result of the refining of the extracted data, wherein a meta model comprises one or more of a set of information types, a set of controls, a set of security assessment procedures, and a set of model activities;

generate a plan to perform or execute an accreditation of a software application or component, wherein generating the plan further comprises accessing one or more meta models relevant to the accreditation process for the software application or component, identifying one or more accreditation activities in each meta model, extracting model activities associated with a set of controls from each meta model, and generating a recommended schedule for the model activities based on a status of a set of controls associated with the software application or component;

automate an accreditation life cycle process using the one or more meta models; and generate a dashboard to provide a portfolio view and display for the developer to assist in managing accreditation workload and processing.

9. The system of claim 8, wherein the corpus of documents was prepared by a standards setting or regulatory organization.

10. The system of claim 8, wherein the set of model activities comprise one or more of a review of security assessment requirements, selection of controls, performing implementation testing, performing penetration testing, or seeking approvals.

11. The system of claim 8, wherein the software application component is intended for use in an administrative process of the agency.

12. The system of claim 11, wherein the administrative process is one or more of payroll, finance, logistics, or personnel management.

13. The system of claim 1, wherein identifying and extracting relevant data from one or more documents in the corpus further comprises one or more of using a Natural Language Processing (NLP) technique, a Natural Language Understanding technique (NLU), a large-language-model (LLM), or image processing.

14. The system of claim 1, further comprising a data-maps database including one or more of accreditations, applications, components, plans of action and milestones, and meta models.

15. One or more non-transitory computer-readable media including a set of computer-executable instructions that when executed by one or more programmed electronic processors, cause the electronic processors to:

identify a corpus of documents describing one or more standards for software used by an agency;

access the identified corpus of documents;

identify and extract relevant data from one or more documents in the corpus, wherein the relevant data comprises one or more of information types, information type categories, security controls families, security controls, security assessment objectives, and a risk management framework process and guidelines;

refine the extracted data, wherein refining the data further comprises identifying one or more security controls based on a set of information types provided by a software developer, identifying one or more assessment procedures for the identified security controls, and identifying one or more model activities used to implement the security controls for the assessment procedures;

form or access one or more meta models based on the information and data obtained as a result of the refining of the extracted data, wherein a meta model comprises one or more of a set of information types, a set of controls, a set of security assessment procedures, and a set of model activities;

generate a plan to perform or execute an accreditation of a software application or component, wherein generating the plan further comprises accessing one or more meta models relevant to the accreditation process for the software application or component, identifying one or more accreditation activities in each meta model, extracting model activities associated with a set of controls from each meta model, and generating a recommended schedule for the model activities based on a status of a set of controls associated with the software application or component;

automate an accreditation life cycle process using the one or more meta models; and generate a dashboard to provide a portfolio view and display for the developer to assist in managing accreditation workload and processing.

16. The one or more non-transitory computer-readable media of claim 15, wherein the corpus of documents was prepared by a standards setting or regulatory organization.

17. The one or more non-transitory computer-readable media of claim 15, wherein the set of model activities comprise one or more of a review of security assessment requirements, selection of controls, performing implementation testing, performing penetration testing, or seeking approvals.

18. The one or more non-transitory computer-readable media of claim 15, wherein the software application component is intended for use in an administrative process of the agency, and further wherein the administrative process is one or more of payroll, finance, logistics, or personnel management.

19. The one or more non-transitory computer-readable media of claim 15, wherein identifying and extracting relevant data from one or more documents in the corpus further comprises one or more of using a Natural Language Processing (NLP) technique, a Natural Language Understanding technique (NLU), a large-language-model (LLM), or image processing.

20. The one or more non-transitory computer-readable media of claim 15, wherein the set of computer-executable instructions further cause the electronic processors to maintain a data-maps database including one or more of accreditations, applications, components, plans of action and milestones, and meta models.

* * * * *